(12) United States Patent
Joseph

(10) Patent No.: US 11,446,854 B2
(45) Date of Patent: Sep. 20, 2022

(54) METHOD AND APPARATUS FOR CALIBRATION OF BLOWN-FILM EXTRUSION APPARATUS

(71) Applicant: Daniel R. Joseph, Arlington, TX (US)

(72) Inventor: Daniel R. Joseph, Arlington, TX (US)

( * ) Notice: Subject to any disclaimer, the term of this patent is extended or adjusted under 35 U.S.C. 154(b) by 162 days.

(21) Appl. No.: 16/715,152

(22) Filed: Dec. 16, 2019

(65) Prior Publication Data
US 2021/0178650 A1 Jun. 17, 2021

(51) Int. Cl.
*B29C 48/92* (2019.01)
*G05B 19/042* (2006.01)
*B29C 48/10* (2019.01)

(52) U.S. Cl.
CPC .............. *B29C 48/92* (2019.02); *B29C 48/10* (2019.02); *G05B 19/042* (2013.01); *B29C 2948/92171* (2019.02); *B29C 2948/92428* (2019.02); *B29C 2948/92923* (2019.02); *G05B 2219/21064* (2013.01)

(58) Field of Classification Search
CPC .................. B29C 48/92; B29C 48/10; B29C 2948/92171; B29C 2948/92428; B29C 2948/92923; B29C 2948/92133; B29C 2948/92447; B29C 2948/92628; B29C 2948/92666; B29C 48/0017; B29C 48/0018; B29C 48/32; B29C 48/325; B29C 2948/92438; B29C 2948/92904; B29C 2948/92933; G05B 19/042; G05B 2219/21064

See application file for complete search history.

(56) References Cited

U.S. PATENT DOCUMENTS

| | | | | | |
|---|---|---|---|---|---|
| 3,286,302 | A | * | 11/1966 | Doering | B29C 48/92 |
| | | | | | 425/141 |
| 3,396,219 | A | * | 8/1968 | Amberg, Jr. | G01N 23/16 |
| | | | | | 264/40.1 |
| 3,474,160 | A | * | 10/1969 | Doering | B29C 48/92 |
| | | | | | 264/40.1 |

(Continued)

OTHER PUBLICATIONS

Sysmetric Ltd, Advanced Bubble Control ABC User Manual, Israel, Oct. 25, 2013, pp. 8, 16, 40-41.

*Primary Examiner* — Jeffrey M Wollschlager
(74) *Attorney, Agent, or Firm* — Mark D. Perdue

(57) ABSTRACT

A method comprises the steps of continuously measuring, proximal a tube extrusion die, a diameter of tubing extruded by the die, to produce a plurality of die-measurement or layflat samples; and continuously measuring, downstream of the tube extrusion die and proximal an accumulation point of flattened tubing, a width of the flattened tubing, to produce a plurality of flat-width samples. A slope value is calculated over a selected interval of the layflat samples and the flat-width samples to determine the stability of the diameter of the tubing and the width of the flattened tubing. A y-intercept value is calculated over the selected interval of the layflat samples and the flat-width samples to determine a forecast trend of the diameter of the tubing and the width of the flattened tubing. When the slope values, y-intercept values, and variances are within selected parameters indicative of a stable operation of the tube extrusion die and the accumulation of flattened tubing, the tube extrusion die is calibrated to produce a selected width of flattened tubing.

12 Claims, 10 Drawing Sheets

(56) References Cited

U.S. PATENT DOCUMENTS

| | | | | |
|---|---|---|---|---|
| 3,990,824 | A * | 11/1976 | Behr | B29C 48/92 425/140 |
| 3,992,107 | A * | 11/1976 | Loy | G01B 11/046 356/637 |
| 4,140,460 | A * | 2/1979 | Carlsen | B29C 48/92 425/140 |
| 4,189,288 | A * | 2/1980 | Halter | B29C 48/92 425/72.1 |
| 4,192,637 | A | 3/1980 | Chong | |
| 4,246,212 | A | 1/1981 | Upmeier et al. | |
| 4,351,785 | A | 9/1982 | Upmeier et al. | |
| 4,424,178 | A * | 1/1984 | Daubenbu/ chel | B29C 48/475 264/40.1 |
| 4,551,289 | A | 11/1985 | Schwab et al. | |
| 4,699,580 | A * | 10/1987 | Co | B29C 48/08 425/72.1 |
| 4,886,438 | A | 12/1989 | Borger et al. | |
| 5,128,076 | A * | 7/1992 | Akselrod | B29C 48/355 264/412 |
| 5,178,806 | A | 1/1993 | Predohl | |
| 5,202,068 | A * | 4/1993 | Mayer | B29C 48/92 264/40.1 |
| 5,272,649 | A * | 12/1993 | Campbell | G01B 11/022 702/84 |
| 5,288,441 | A * | 2/1994 | Collins | B29C 48/10 264/410 |
| 5,384,080 | A | 1/1995 | Feistkorn et al. | |
| 5,951,926 | A | 9/1999 | Sensen et al. | |
| 6,423,261 | B1 | 7/2002 | Joseph et al. | |
| 6,922,608 | B2 | 7/2005 | Joseph | |
| 7,858,953 | B2 | 12/2010 | Hughes et al. | |
| 8,347,686 | B2 | 1/2013 | Joseph | |
| 9,248,601 | B2 * | 2/2016 | Kulgemeyer | B29C 48/912 |
| 9,302,423 | B2 | 4/2016 | Bayer et al. | |
| 2001/0023998 | A1 * | 9/2001 | Joseph | B29C 48/10 264/40.3 |
| 2002/0076459 | A1 * | 6/2002 | Joseph | B29C 48/92 425/72.1 |
| 2004/0015260 | A1 * | 1/2004 | Joseph | B29C 48/92 700/196 |
| 2011/0112677 | A1 | 5/2011 | Franklin | |
| 2016/0096307 | A1 | 4/2016 | Meyer | |
| 2016/0193774 | A1 * | 7/2016 | Martena | B29C 48/0023 264/40.1 |
| 2017/0233243 | A1 * | 8/2017 | McNicholas | B64G 5/00 141/94 |

\* cited by examiner

METHOD AND APPARATUS FOR CALIBRATION OF BLOWN-FILM EXTRUSION APPARATUS

BACKGROUND OF THE INVENTION

1. Field of the Invention

The invention relates generally to blown-film extrusion apparatus. More particularly, the invention relates to calibration of blown-film extrusion apparatus to produce film of selected final width.

2. Background of the Invention

Blown-film extrusion is the dominant method of producing polymer or plastic tubes and sheeting. Typically, blown-film extrusion is carried out vertically upwards (see, e.g. FIG. 1), but horizontal and downward extrusion processes are also used in specialized applications. Polymer material is melted into a viscous liquid and then is extruded through an annular die. Air is injected through a hole in the center of the die, and the pressure causes the extruded melt to expand into a conical tube shape. An external cooling device creates at least one venturi zone to lock the tube to a mechanical forming cone designed to maintain the conical tube shape as the material transitions to a constant diameter tube. For dies that support a second, internal cooling circuit, two air flow paths are provided; one for cold air entering the bubble replacing the hot air leaving it via the second path, so that a controlled pressure is maintained to ensure uniform diameter of the polymer tube while cooling the internal surface in a manner similar to external bubble surface cooling. This reduces the temperature inside the polymer tube, while maintaining the correct tube diameter so the tube cools and solidifies at the correct diameter. Generally, the result of the second, internal cooling circuit is increased production rate and significantly reduced startup times. A control system is required to precisely maintain the internal pressure.

As the viscous liquid travels away from the die, the cooling process transitions the phase from liquid to solid. Both the tube profile and the sudden onset of a slight haziness at a position on the tube indicate the transition is nearly complete. This position is often referred to as the "frost" or "freeze" line. The most accurate measurement of the tube diameter is done after this position as the tube diameter below the frost line is progressively increasing in a parabolic manner. Above the frost line, the tube has roughly reached the final diameter. Tube diameter measuring sensors are positioned at least double, but not more than triple the frost line height above the die to achieve the desired measurement accuracy. After the tube-diameter measuring point, the polymer tube moves into a low-friction collapsing frame, which leads to a set of nip rollers. The collapsing frame forces the tube into a transition from round to flat so the film can physically enter into the small gap between the nip rollers. The nip rollers grip the flattened tube and provide the pulling force required to move the tube up the extrusion tower (the speed of the nip rollers relative to the material exit rate from the die controls material thickness). The result is a fully flattened tube of two flat film layers, of a selected flat width, which are then pulled by a winder or a second set of nip rollers into the winding or accumulation station. Prior to the accumulation station, the tube may optionally be slit to form various flat sheet configurations.

Flat-width management is a necessary function of every blown-film extrusion line. Because blown film starts out as a round tube and not a flat sheet, it is important to manage the final flat width as early in the process as possible to avoid producing out-of-specification material. Otherwise, the material between the first width control measurement point and the tube origination point (extrusion die) is at risk of being produced outside of required specifications. As many blown film production jobs result in a final product roll of significant diameter—requiring significant amounts of production time—the condition of producing a roll with portions not within specification is unacceptable and generally results in scrapping the entire roll.

The most efficient control systems make the first measurement early in the process, preferably while the film is still a tube and preferably close to the position where the tube has reached the maximum diameter (film extruded generally grows to a particular diameter required to produce the final width, but soon begins to shrinks as it cools and additionally after it becomes under tension).

Control systems exist that have flat-width measurement bars located near the nip rollers or near the windup rollers or both positions. Some systems, using two measurement bars, are also programmed to manage web tension control based on film width shrinkage. Tension-induced shrinkage is the difference of the width measured at or near the nip rollers and the width measured at the windup rollers. If the tension is too high, the shrinkage will be excessive. This measured width difference can be used to trim tension levels up or down to manage the shrinkage to a specified amount while maintaining sufficient tension to ensure the web travels predictably down the tower to the accumulation station.

In any case, controlling the final blown film flat width using only flat width measuring devices creates a control lag (or time delay) in the control process. This is because the measuring devices can only indicate flat width error after the tube passes the first flattening nip roller. Process and defect errors often occur prior to the flattening nip rollers. The control lag is inversely proportional to the line speed which is inversely proportional to film thickness. In comparison to an alternative embodiment described below, out-of-specification material will take longer to correct and result in more scrap and downtime. Another example highlighting control lag would be when a hole is induced into the tube by defect. Air escapes from inside the tube until the hole passes the upper flattening nip rollers. The escaping air releases internal pressure which results in an immediate reduction in the tube diameter. Until the hole passes a flat width measuring device, there is no corrective control action possible and the tube diameter (and resulting flat width) continues to decrease. If the amount of air escaping reduces the tube diameter sufficiently, it causes the tube to unlock from the venturi holding the tube to the mechanical forming cone. When the tube unlocks, the integrity of the tube is lost and often results in a unrecoverable condition requiring the machine to be stopped, cleaned and restarted—a process taking 30-60 minutes depending on the size of the machine and available manpower.

The solution is to measure the polymer tube earlier in the production process with tube diameter measuring sensors—preferably non-contact type to prevent marking the soft polymer—and preferably ultrasonic types which have no dependence on film color, thickness, or dust accumulation on the sensor face as do optical based non-contact sensors (laser, ultra-violet, infrared and visible light sources).

As mentioned previously, the cooling effect causes the polymer tube to begin shrinking almost immediately after it reaches its maximum diameter. This is independent of any tension-induced shrinkage occurring after the nip rollers. Reducing cooling to reduce shrinkage is not an option as passage of the uncooled material through the nip rollers can result in the two material surfaces welding together. Therefore, there is no way to avoid tube diameter shrinkage. Further, this shrinkage is significant enough to require a controlled correction in order to ensure the correct final width.

In previous implementations, this correction is generated by having the machine operator measure (manually or electronically), the flat width near the accumulation or winding station and enter this value into the width controller. This value is used to calculate the error between the calculated flat width based on the tube diameter measurement and the actual flat width measurement. The controller uses the error to calculate a compensating factor which, when applied in a continuous manner, results in the tube diameter being produced slightly larger than necessary; but after shrinkage from cooling and tension effects occur, a correct flat width is the result.

The problem with previous implementations is the dependency on the state of the measuring bar (or the operators'—often requires two operators) ability to make an accurate and timely measurement. If the flat width measurement is not accurate (due to malfunction, operator error, unsteady process conditions, film wrinkles or curl), the calibration factor will not improve accuracy of the final film width, but decrease it instead. Further, if the calibration performed before the process is stable, the flat width measurement, even if it is accurate will result in an improper calibration. The operator then must recognize the error and attempt to recalibrate. Without sufficient skill, the operator will often calibrate multiple times until the process becomes stable enough for the calibration to be effective. Clearly the multiple conditions required to be successful at calibrating blown film extrusion width control system require either a skilled operator or a control system that monitors and automates the process—ensuring faster job changes and less scrap produced.

SUMMARY OF THE INVENTION

It is a general object of the present invention to provide a method and system for calibrating a blown-film extrusion apparatus to produce a selected final blown film flat width.

This and other objects of the invention are achieved with a method comprising the steps of continuously measuring, proximal a tube extrusion die, a diameter of tubing extruded by the die, to produce a plurality of die-measurement or layflat samples; and continuously measuring, downstream of the tube extrusion die and proximal an accumulation point of flattened tubing, a width of the flattened tubing, to produce a plurality of flat-width samples.

A slope value is calculated over a selected interval of the layflat samples and the flat-width samples to determine the stability of the diameter of the tubing and the width of the flattened tubing.

A y-intercept value is calculated over the selected interval of the layflat samples and the flat-width samples to determine a trend of the diameter of the tubing and the width of the flattened tubing.

Variance values are calculated between the slope values of the layflat samples and flat-width samples to determine correlation between the samples and the slope values; and, when the slope values, y-intercept values, and variances are within selected parameters indicative of a stable operation of the tube extrusion die and the accumulation of flattened tubing, the tube extrusion die is calibrated to produce a selected width of flattened tubing.

According to one aspect of the invention, the step of calculating a slope value over a selected interval further comprises the step of applying least-squares regression to the layflat samples and the flat-width samples.

According to another aspect of the invention, the step of calculating the y-intercept values over a selected interval further comprises the step of applying least-squares regression to the layflat samples and the flat-width samples.

According to another aspect of the invention, curl and wrinkles in the film are detected by monitoring a relative position of edges of the flattened tubing and calculating a rate of change of each edge. If the rate of change of one of the edges oscillates above a selected threshold, a wrinkle at the edge of the flattened tubing is indicated. If the rate of change of one of the edges exceeds a threshold for a selected period of time, a curl at the edge of the flattened tubing is indicated.

Other features, aspects, and objects of the present invention will become apparent to those skilled in the art with reference to the figures and the detailed description of the invention, which follows.

DETAILED DESCRIPTION OF THE INVENTION

Figure 1:
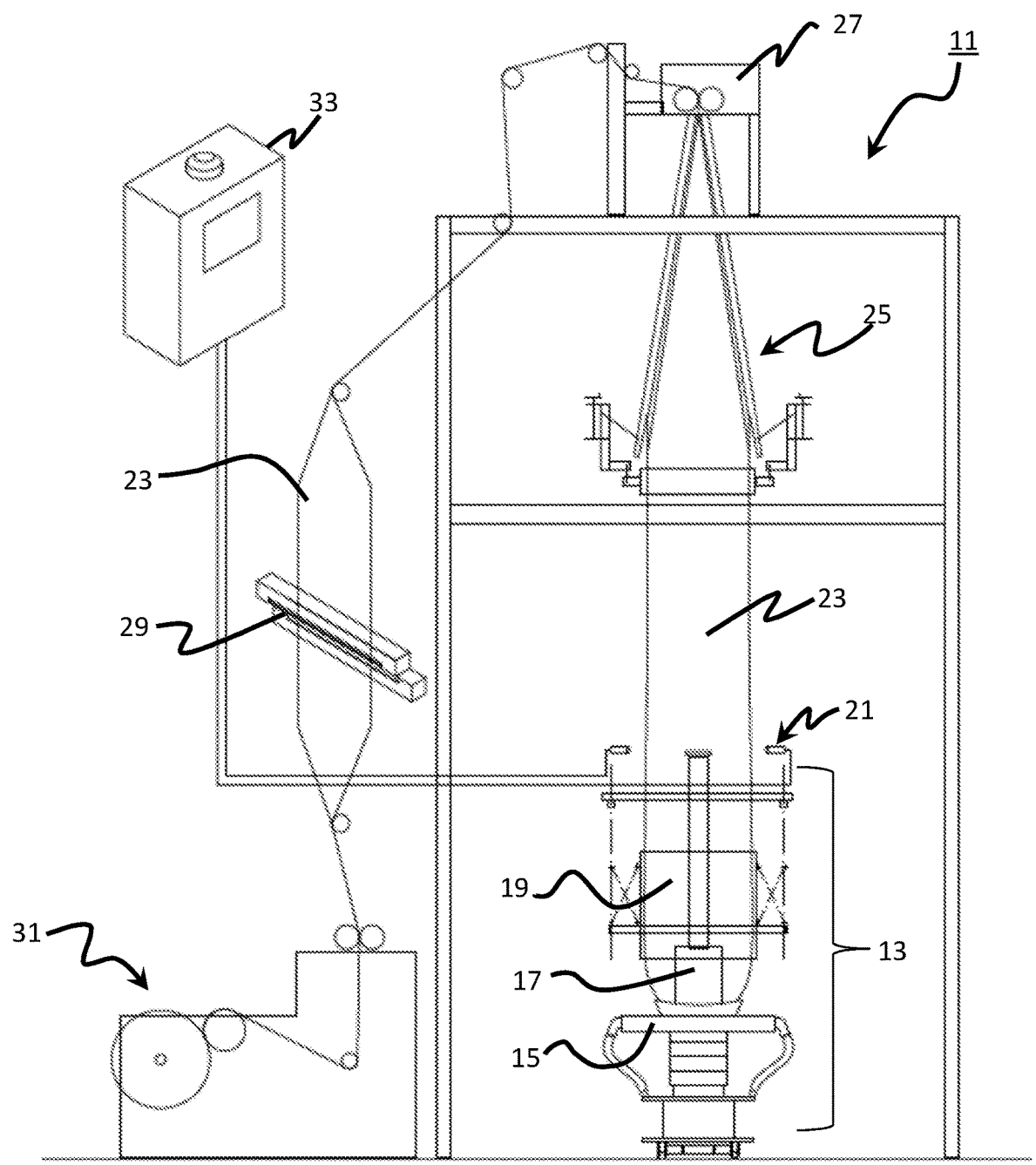
FIG. 1 is an elevation view of a blown-film extrusion apparatus of the type with which the present invention is contemplated.

Turning now to the Figures and in particular to FIG. 1, a blown-film extrusion apparatus 11, as previously described and as adapted for use in the present invention is shown. As previously described, an extrusion die and blower assembly 13 extrude a polymer tube or bubble 23 that extends vertically upward. Die 13 includes an air ring or external cooling device 15 as well as an internal cooling device 17 and bubble sizing cage 19. A set of tube-diameter sensors 21 is located proximal the outer diameter of tube 23 just above the frost line. Sensors 21 preferably are a plurality of non-contact ultrasonic sensors arranged in a circular array about the outer diameter of tube 23. As indicated, sensors 21 measure the diameter of tube 23 as it passes by. The extrusion die also includes a width-controller, which adjusts parameters of the die to adjust the diameter of the tube or bubble 23 and the resulting width of the film. The width-controller employs data from tube-diameter sensors 21 in performing its function.

Above tube diameter sensors 21, a collapsing frame 25 assists in collapsing the cylindrical tube 23 into a flattened tube, where it enters a nip roller assembly 27. A fully flattened and shrunk tube 23 emerges from the nip roller assembly 27, moves over a series of idler rollers to a flat-width measurement bar 29. A preferred flat-width measurement bar is a Kundig FE-8 infrared, non-contact measurement bar available from Hch. Kündig & Cie. AG, Joweid Zentrum 11a, 8630 Ruti ZH, Switzerland. Measurement bar 29 measures the width of flattened tube 23 and records the relative position of the edges of the flattened tube.

After flat-width measurement bar 29, the flattened tube 23 passes to a windup assembly 31, where the final film product is wound onto a roll. An electronic controller 33 receives data inputs and measurements from tube-diameter sensors 21, flat-width measurement bar 29, and various other components of the system as described in greater detail below. As mentioned previously, FIG. 1 illustrates a vertically upwardly oriented extrusion apparatus or system, but the present invention has utility in vertically downwardly oriented and horizontally oriented systems, as well.

Figure 2:
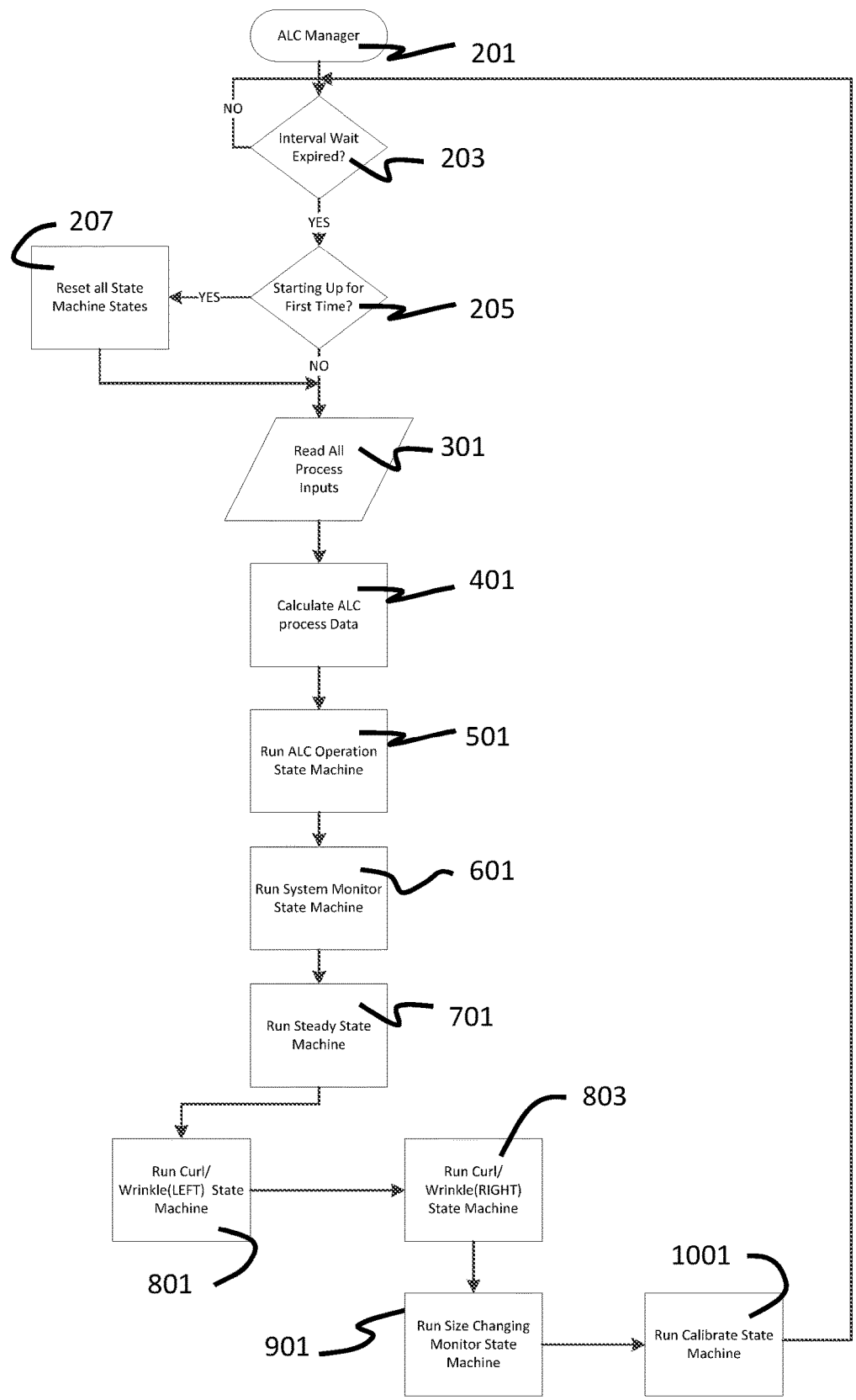
FIG. 2 is a flow chart depicting the steps and logic of the process or method in accordance with a preferred embodiment of the present invention.

Turning now to FIGS. 2 through 10, flowcharts depict the methods and processes employed according to the method of the present invention. FIG. 2 is an overview of the process known to the inventor as "Automatic Layflat Calibration" or ALC, and the overall process or routine is referred to as ALC Manager 201.

At step 203, an initial test is run for expiration of wait interval or calibration delay. The interval wait value represents the amount of time to accomplish a layflat calibration under the current running conditions. The purpose of this wait is to ensure the ALC does not restart the calibration process until the extrusion process variables (flat width, frost line height, bubble cage control) have had a chance to stabilize. This wait will be zero unless a successful calibration has previously completed.

At step 205, a check is made whether the process is running for the first time since a power down or other condition that terminates the process. If it is a first-time run, all state machines are reset at step 207, which means purging of memory devices and data from prior operations. Each state machine has an initial state that represents the starting condition or beginning of decision tree for each state machine. At power up, or startup of the line, it is important that all state machines are in a known starting or beginning state. If it is not a first-time run, the ALC process continues on an iterative or repeating basis at step 301, where process data inputs from the various system sensors described in connection with FIG. 1 are read as described in detail in FIG. 3.

After reading process input data at step 301, the data is employed at step 401 to calculate values such as slope/rate-of-change and y-intercept, for both the layflat (tube diameter sensors 21) width and the flat-width (flat measurement bar 29) width, that are employed in other steps of the process, as detailed in connection with FIG. 4 and the associated description. "Layflat" is used herein to mean width measured at the tube diameter sensors 21, which is actually a diameter measurement related to width as half the circumference of the tube ($\pi D/2$), while "flat-width" is used herein to refer to width measured at flat-measurement bars 29, after the tube is actually flattened). Calculating the slope of these measured values provides an indication of their stability (zero slope being maximum stability) and a forecast trend (positive slope is increasing value, negative is decreasing). The y-intercept provides a forecasted value. The slope and y-intercept are calculated by applying least-squares linear regression to the data over the interval. An R-squared value of the data may also be calculated to determine how well the data correlates within the regression analysis (goodness of fit), and as another measure of stability of the measured or sampled values (high variance indicating instability). The R-squared value is between 0 and 1, with values closer to 1 indicating high correlation and low variance in the data, which also indicates stability of the measurements.

After calculating values at step 401, the values are compared to thresholds in an ALC state machine at step 501 as described in greater detail in connection with FIG. 5.

At step 601, the system monitor state machine is run as detailed in connection with FIG. 6 and the associated description.

At step 701, the steady-state state machine is run as described in greater detail in connection with FIG. 7.

At steps 801 and 803, the curl and wrinkle state machine is run, for the left and right edges, respectively, of the flattened tube as detailed in connection with FIG. 8 and the associated description. The relative position of each edge of the flattened tube film is monitored by the associated edge sensor of flat measurement bar 29. An oscillating relative position is indicative of a wrinkle (the changes from wider to narrower quickly), while a high rate of change of relative edge position (usually narrowing) indicates a curl in the edge of the film. Thus, the relative position of each edge (right and left) of the flattened tube is monitored and compared to a pre-selected threshold. If the relative position of an edge oscillates above a threshold, a wrinkle is indicated. If the rate of change of a relative position of an edge exceeds a threshold, a curl is indicated.

Figure 9:
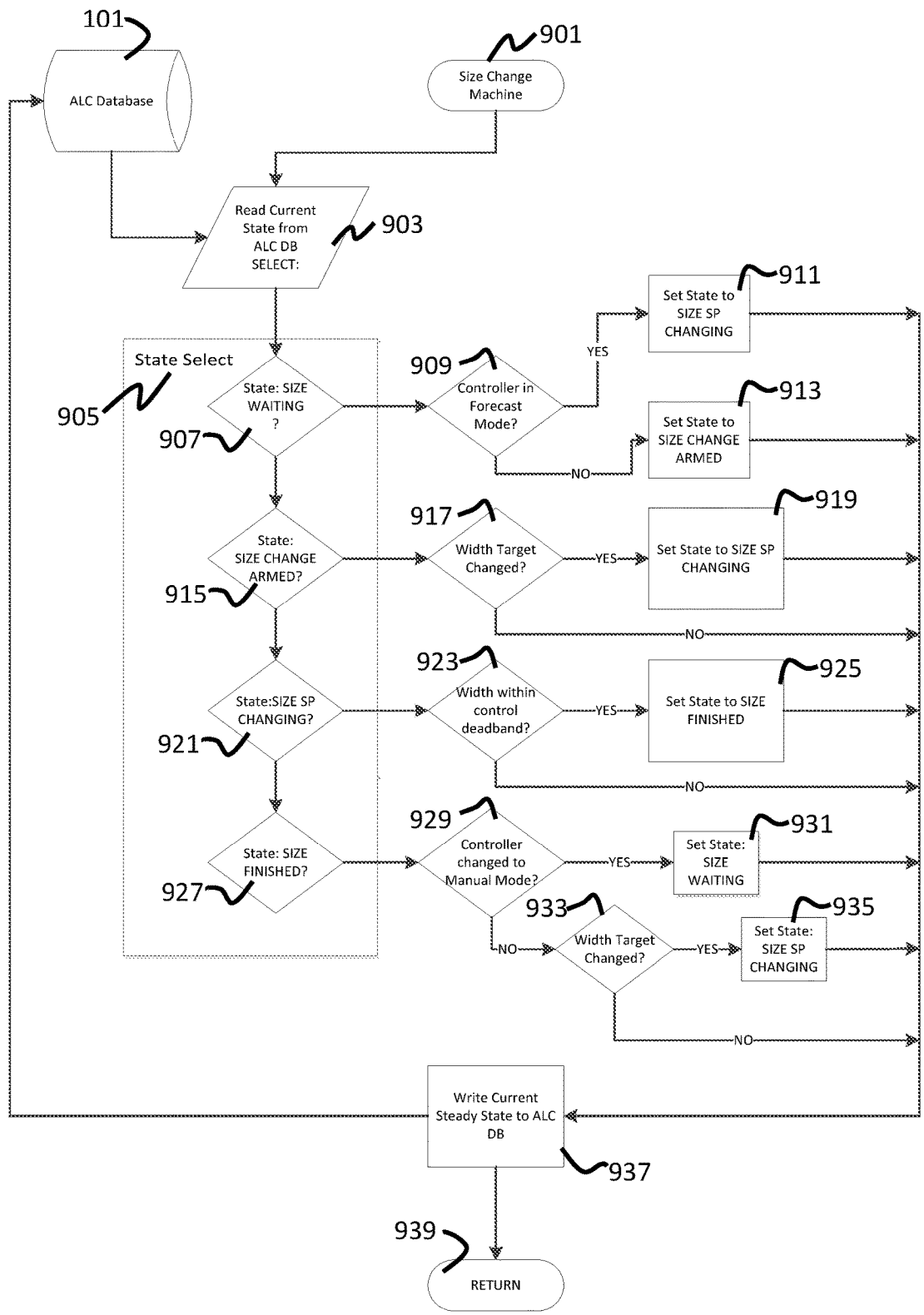

At step 901, the size change monitor state machine is run as described in greater detail in FIG. 9.

At step 1001, the calibrate state machine is run as detailed in connection with FIG. 10 and the associated description. After the calibrate state machine runs, the process commences over again at step 203 for a new set of data.

Although the steps of the ALC process are depicted as being sequential or in series in FIG. 2, they may also be run simultaneously or in parallel, except where sequence is mandatory, as in steps 301 and 401, where data acquisition must precede data processing. The steps of the method are implemented in software that is executed in electronic controller 33 and/or a separate computer. It is intended to run autonomously or automatically, with minimal user intervention. During installation or set-up, a number of threshold or other values are pre-selected or configured by the installer as indicated below. Some values may be altered by the operator or by a factory technician.

Figure 3:
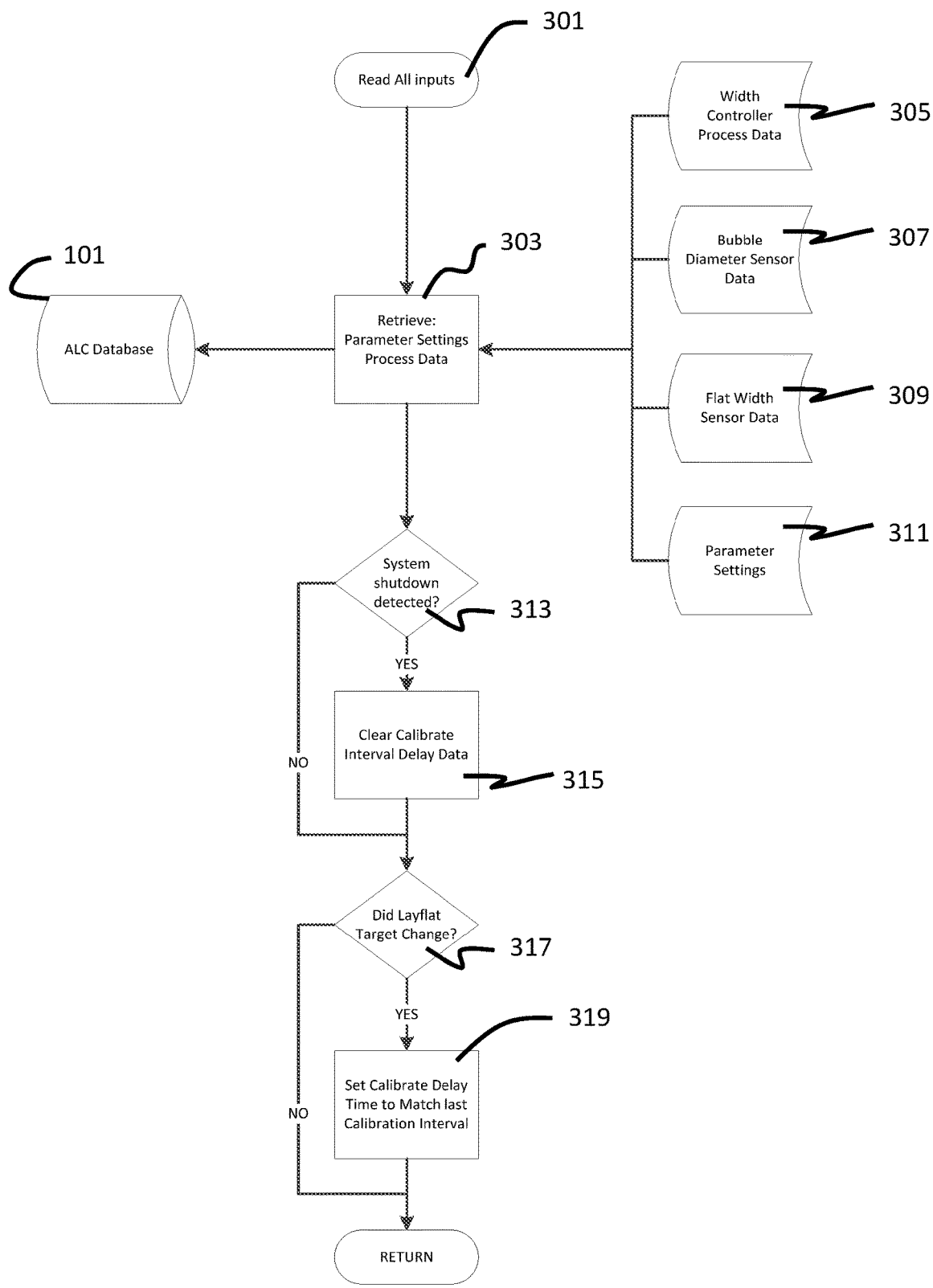
FIGS. 3 through 10 are flow charts further depicting the steps and logic of the process or method in accordance with a preferred embodiment of the present invention illustrated in FIG. 2.

FIG. 3 details the data or inputs read by the system and corresponds to step 301 in FIG. 2. At step 303, process and sensor data is read from the width controller at 305, from the bubble or tube diameter sensors (21 in FIG. 1) at 307, from the flat-width sensor (29 in FIG. 1) at step 309, and parameter or threshold values for the same data at step 311. The parameter values are established by the user or may be calculated from historical data or a combination.

At step 313, a system shutdown is detected. If there is a recent system shutdown, calibration data is cleared and the data collection interval is restarted at block 315. If no system shutdown is detected, data collection continues.

At step 317, if the layflat or width target for film product has changed (as in the case of a new product run), the data collection interval is established to match the last calibration interval at step 319 (this is the same value referenced at step 203 in FIG. 2). If no width target change is detected, data collection continues.

Figure 4:
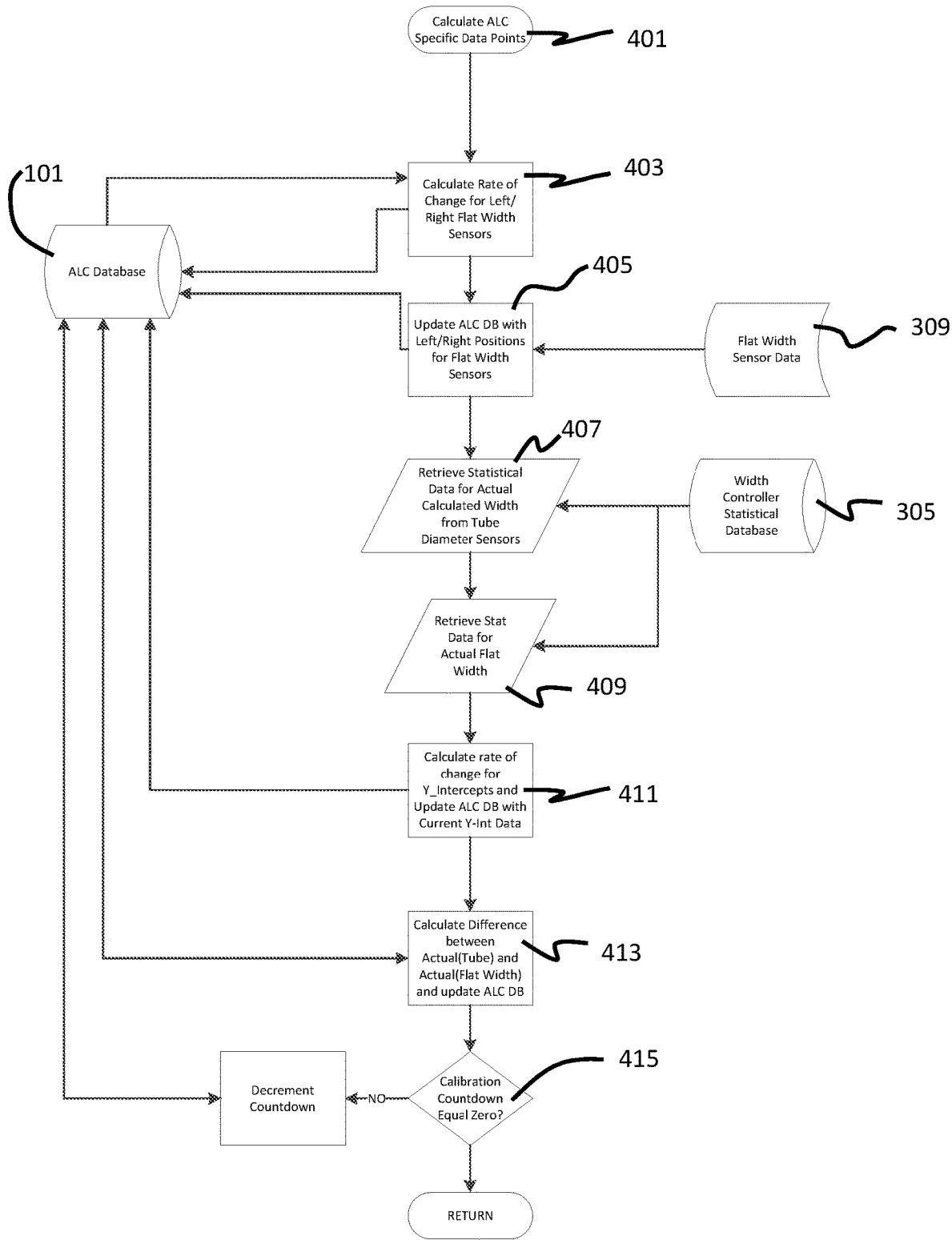

FIG. 4 illustrates the data processing or calculation steps executed by the method according to an embodiment of the present invention and corresponds to step or block 401 in FIG. 2.

All processes in this diagram are using data gathered and saved in ALC database 101. At step 403, for instance, the calculation of rate of change of left and right flat width sensors is managed by looking up the previous positions from the ALC database and comparing them to the current positions. At step 405, the ALC database is updated with current positions from step 309 to be used in the next process pass.

A series of flat widths is calculated from the data samples of flat-width sensors (29) over a selected time interval. Linear regression (least squares) is applied to obtain a slope and y-intercept values for this data. Also an R-squared value is calculated for the data. Other regression or numerical methods may be used to calculate these values.

Similarly, a series of die-measurement or layflat width (layflat is used herein to mean width at the tube diameter sensors 21) is measured and calculated from the tube diameter sensor data samples. Linear regression (again least squares) is applied and slope, y-intercept, and R-squared values are also obtained for this set of layflat values, as with the flat-width measurements. Again, other regression or numerical methods may be used to calculate these values A similar process is carried out at steps 407, 409, and 411 for the purpose of calculating rate of change in the y-intercept data points.

At step 413, the difference between the actual layflat from the tube diameter sensors 21 and the actual flat-width from the flat-width bar 29 is calculated.

All conditions needed for the ALC process are read all at one time and calculated data is generated shortly after reading. In this manner, the state machine logic can process without the system needing to be programmed to consider transition issues while calculating the outcome of each state machine.

These data are stored in arrays with corresponding time stamps over a selected time interval in ALC database 101 for use in other processes, as detailed below.

Figure 5:
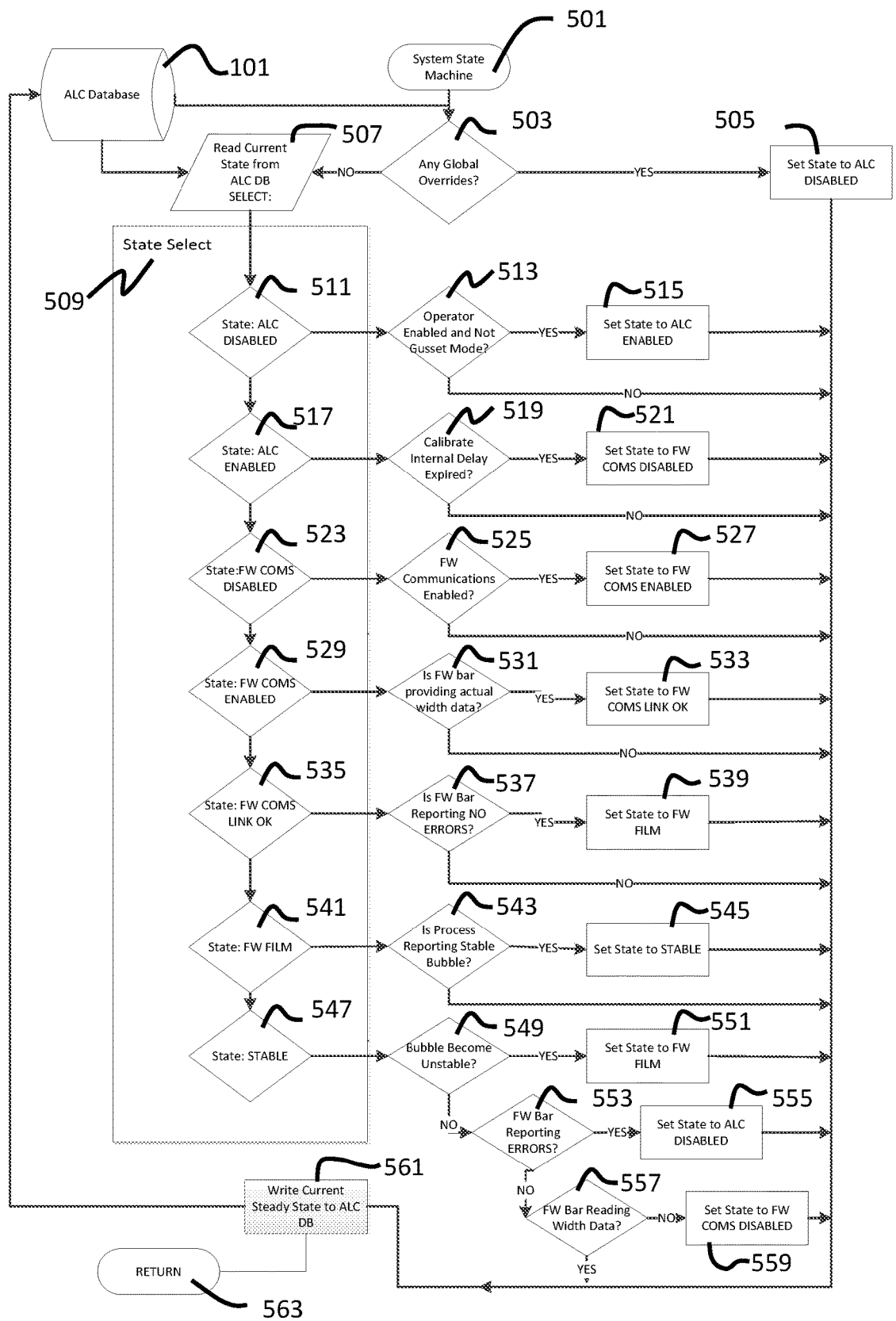

FIG. 5 details the SYSTEM State Machine process 501. The objective of this routine is to validate all the conditions necessary to ensure all data used by the ALC system is valid and sound. Failures discovered result in the prevention of a calibration occurring. This is a self-healing routine that requires no reset to recover once a detected fault condition is rectified. This includes data from flat width sensors and a variety of sub-conditions that aid in troubleshooting. The possible states are: ALC DISABLED, ALC ENABLED, FW COMS DISABLED, FW COMS ENABLED, FW COMS LINK OK, FW FILM, and STABLE. The STABLE state is the desired state for all subsequent state machines to execute. All states are exclusive; that is, none occur at the same time.

Starting at step 503, the machine collects data from the ALC database (101) to be used in the Global Override decision process which, if true, results in the state machine changing to the ALC DISABLED State at step 505. If there are no global overrides, step 507 reads the current state from the ALC Database (101) and executes a case-select step 509, which decides which single decision tree branch to execute (steps 511, 517, 523, 529, 535, 541, or 547).

At step 511, the state is ALC DISABLED. In this state, at step 513, the state of a user-accessed switch is detected. If ALC is enabled by the switch AND the width control system is NOT in gusseting mode, the state is changed to ALC ENABLED at step 515.

At step 517, the state is ALC ENABLED. In this state, at step 519, whether a previous calibration wait interval or delay (the same value reference at steps 203 and 317, above) has expired (determined by testing for the remaining delay value to be zero). If the decision is true, and the interval expired, the state is changed to FW COMS DISABLED, at step 521.

At step 523, the state is FW COMS DISABLED. In this state, the communication configuration switch for the flat width sensors (which are independent of the ALC system) is read at step 525. If the switch is TRUE and the communications enabled, the state is changed to FW COMS ENABLED at step 527.

At step 529, the state is FW COMS ENABLED. The state machine will remain in this state until the flat width measurement device communication process has reached a state of operation where it is reading width data, at step 531. Once the flat width device is indicating it is reading actual width data, the state is changed to FW COMS LINK OK, at step 533.

At step 535, the state is FW COMS LINK OK. The system remains in this state until the flat width measuring device error reporting system indicates that there are no errors in any aspect of the device, at step 537. This can be communications, problems with internal operations, and even lack of signal from the edge detection sensors. When no errors are reported, the state is changed to FW FILM at step 539.

At step 541, the state is FW FILM. In this state, the stability flag from the width control system is monitored at step 543. If the stability flag is true, and the width control system is stable, the state is changed to STABLE, at step 545.

At step 547, the state is STABLE. Whether to remain in this state depends on the maintenance of conditions that made this state possible in the first place. At step 549, the width control process is tested for stability, if unstable, the state is changed to FW FILM, at step 551. At step 553, flat width device is tested for any errors, if errors are present, the state is reset to ALC DISABLED, at step 555, which essentially forces the system to do a full restart in an attempt to rectify the issue. At step 557, the flat width device is tested for providing valid width data, if not, the state is change to FW COMS DISABLED, at step 559.

At this point the system state has been calculated or determined and it is written it to the ALC database (101) at step 561 for use by the next pass in this state machine and also by other state machines. The process is finished at block 563.

Figure 6:
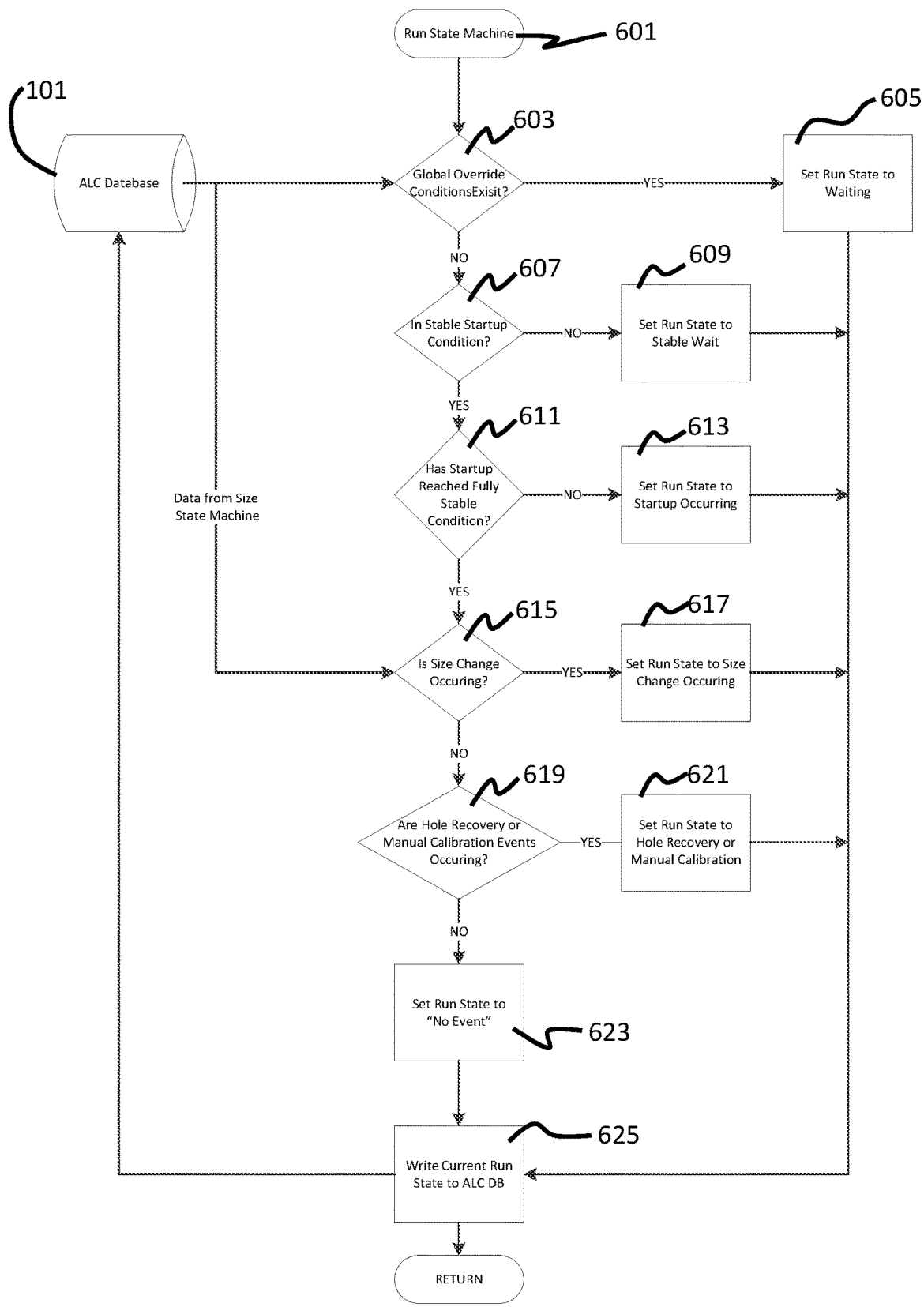

FIG. 6 details the RUN State Machine process 601. This routine determines what state of operation the system is running. The possible states are: WAITING, STABLE WAIT, STARTUP, SIZE CHANGE, HOLE RECOVERY, and NO EVENT. Each of these states are coordinated with the configuration flags set by the operator, which define the conditions in which a calibration can occur. For instance, if the operator has configured the system to calibrate after startup, the RUN State Machine determines if the system is in a Startup state. The routine takes into account if running IBC/GEO or nonIBC as each of these systems have different internal running conditions to monitor. This state data is used by the Calibration State machine 1001 to determine when to do an automatic layflat calibration. Any state change can optionally be delayed by implementing a continuous decision count; wherein if the state decision is true for a consecutive number of passes, the state change takes place. This avoids making state changes based on one instance of a true condition. Essentially, it eliminates state "chattering."

At step 603, global override conditions are tested to ensure the readiness of the state machine and to proceed with testing. The global overrides conditions depend on the overall configuration of the system and the mode of operation. If global override conditions exist, the run state is set to WAITING at step 605, in which the state machine is waiting for proper initial states to proceed. After all of the state changes, the current state is written to the ALC database at step 625.

At steps 607 and 609 are the conditional testing for the state "Stable Wait," which corresponds to a wait state in which the system is stable.

At steps 611 and 613 are the conditional testing for the state "Startup Occurring," which corresponds to a state during which startup has begun, but has not reached stability.

At steps 615 and 617 are the conditional testing for the state "Size Change," which corresponds to a state after a tubing or film size change has been made.

At steps 619 and 621 are the conditional testing for the state "Hole Recovery/Manual Calibration," which corresponds to a state requiring a manually indicated calibration, as after a hole in the film.

Finally at block 623 is the resulting condition of "No Event" which essentially indicates there is no notable run state to report.

The current state after testing is written to the ALC database (101) at step 625.

Figure 7:
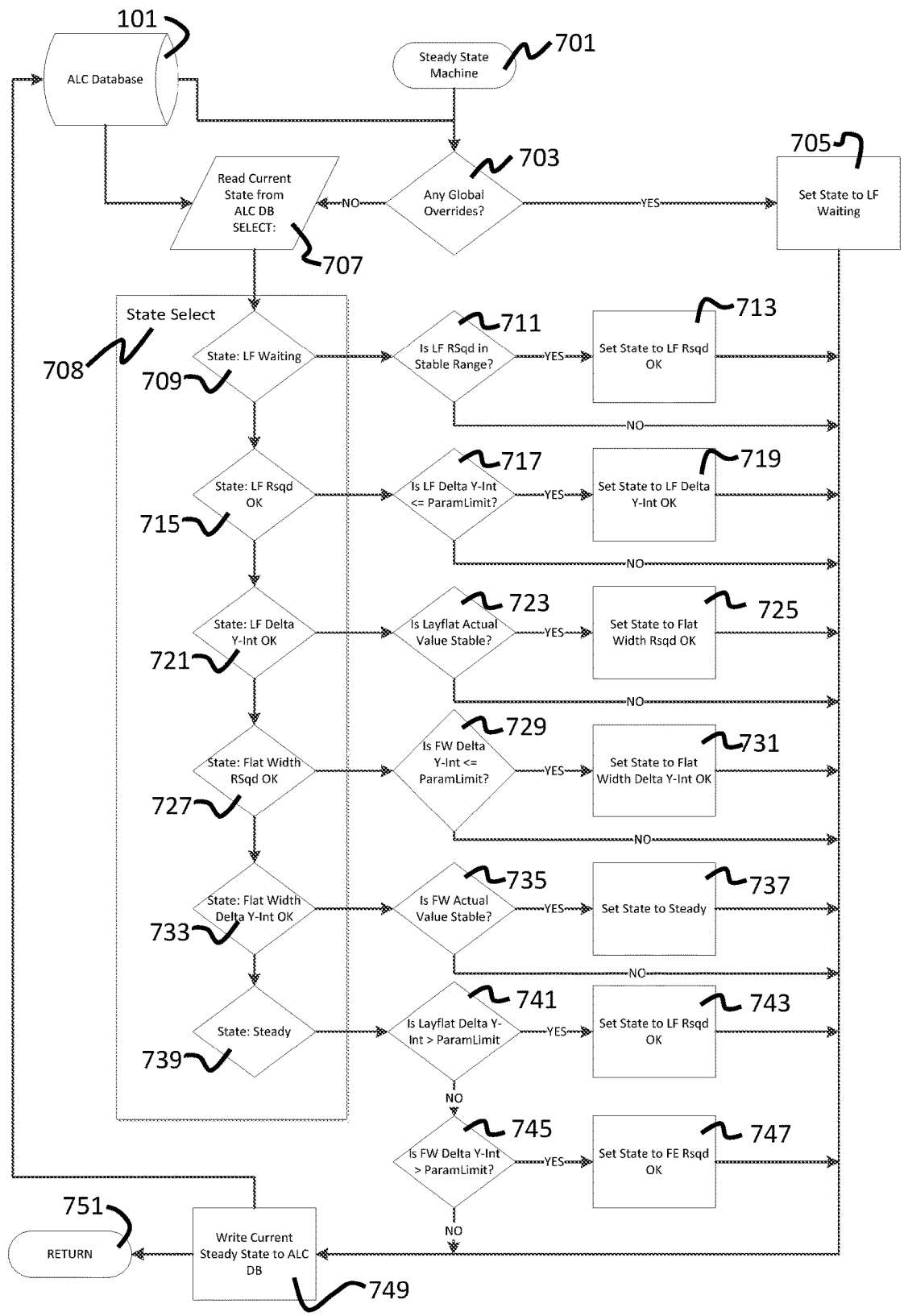

FIG. 7 Details the STEADY State Machine process 701. This routine detects when tube diameter sensors and the flat width sensors are both providing steady data as determined by linear regression metrics. The metrics are compared against parameter limits and statistical norms for linearity in the respective data sets. The possible states are: WAITING, LF RSQD OK, LF DELTA Y-Int OK, Flat Width RSQD OK, Flat Width Delta Y-Int OK, and STEADY. All states are exclusive (none can occur simultaneously). Again, any state change can optionally be delayed by implementing a continuous decision count to avoid state "chattering."

At step 703, ALC database (101) is read for data that would create a global override at step 703 and force the state machine into the LF Waiting state, at step 705. If there is no global override, at step 707 the current state from the ALC Database (101) is read and a case select block 708 which decides which single decision tree branch to execute (709, 715, 721, 727, 733 or 739).

At step 709, the state is LF Waiting. If the linear regression R-Squared calculation for tube diameter sensor layflat data is determined to be in an acceptable range at step 711, the state changes to LF RSQD OK at step 713, At step 715, the state is LF RSQD OK. If the linear regression Y Intercept metric for tube diameter sensor layflat data is determined to be less than or equal to the parameter limit at step 717, the state changes to LF DELTA Y-INT OK at step 719.

At step 721, the state is LF DELTA Y-INT OK. If the layflat data has stabilized with a slope of zero and the actual layflat data is equal to the Y-Intercept metric at step 723, the state changes to FW RSQD OK (725).

Steps 727 through 737 represent the same decisions or state changes as steps 715 through 725, but the data operated on is that from flat-width sensor (flat-measurement bar 29) rather than tube diameter sensor (21) layflat data.

At step 739, the state engine is in the steady state which allows the curl state engine to process. Staying in this state is desirable, but if decisions at block 741 or block 745 determine the layflat Delta Y-Intercept is outside the parameter limits, the state will decay to either LF RSQD OK at step 743 or FW RSQD OK at step 747, respectively.

At step 749, the calculated state is written to the ALC database (101) for use by the next pass in this state machine and also by other state machines. The process is finished at block 751.

Figure 8:
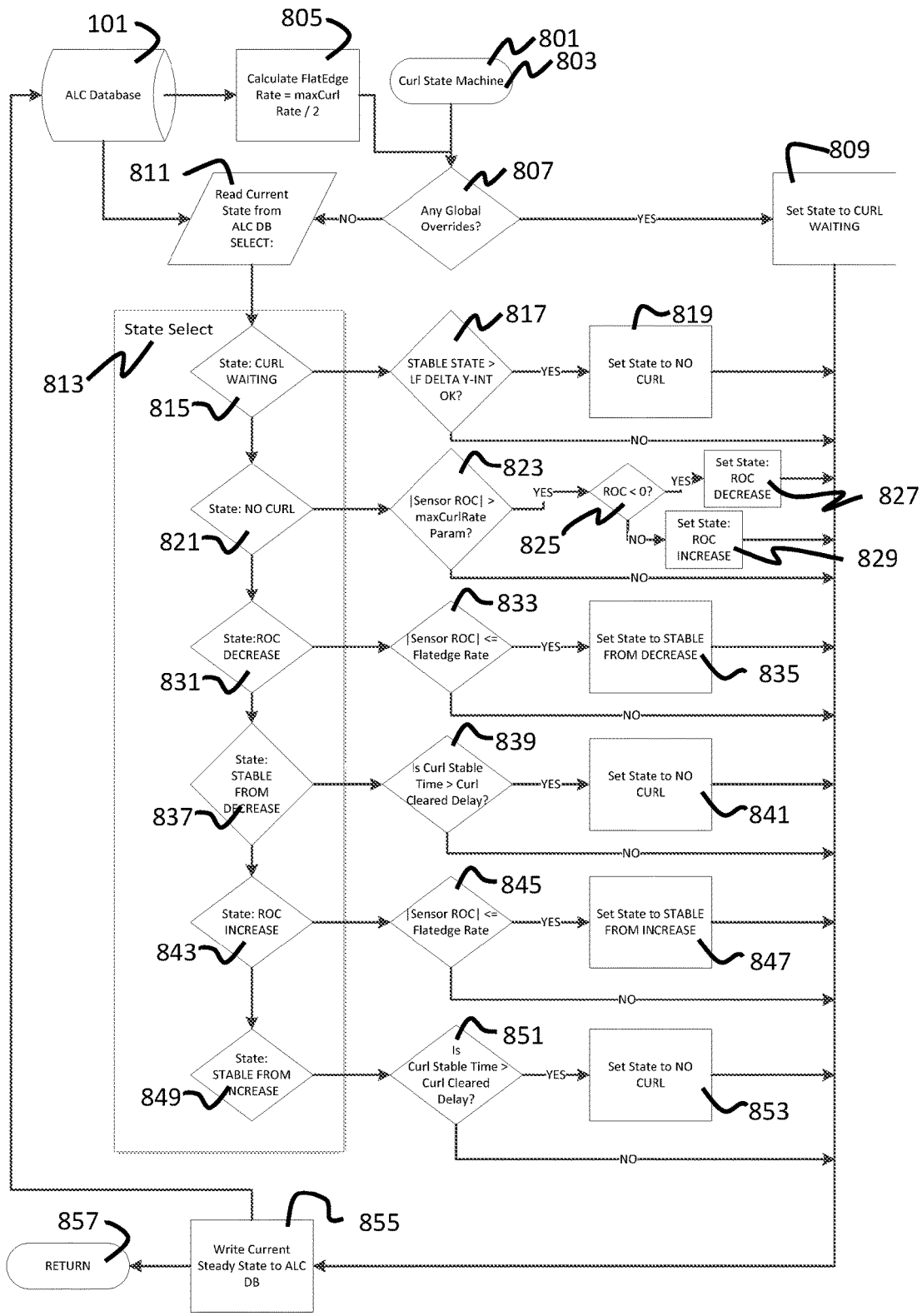

FIG. 8 details the CURL State Machine process 801, which detects film edge curl as sensed by the flat width bar left and right sensors. The right and left sensors are processed independently of each other with a separate state machine 801/803. The process and logic of each of the two state machines are identical other than which sensor is being processed. Therefore only once instance is diagramed. Data from both state machines is fed into Calibration State machine (described in connection with FIG. 10) and the optional wrinkle-detection process, which only operates if the wrinkle detection parameter is configured (pre-selected) to a value greater than zero.

The beginning state is WAITING, at step 815, and the desired state is NO CURL at step 821. The possible states are: WAITING, NO CURL, ROC DECREASE, STABLE FROM DECREASE, ROC INCREASE, and STABLE FROM INCREASE. All states are exclusive. Any state change can optionally be delayed by implementing a continuous decision count to avoid state chattering as described above. In addition, steps that indicate increase (843) or decrease (831) rates of change (ROC) include the ability to transition from increasing to decreasing and vice versa. This would cover situations which are dramatically unstable and keep the state machine synchronized with the actual process conditions. These additional steps are not shown for the sake of keeping the diagram concise in nature.

At step 805, ALC database (101) is read for data that allows the calculation of the FlatEdge Rate (used in steps 833, 845) and to test for a global override, at step 807, which would force the state machine into the WAITING state, at step 809. If there is no global override, the current state is read from the ALC Database (101) at step 811, and a case select step 813 executes, which decides which single decision tree branch to execute (815, 821, 831, 837, 843, or 849).

At step 815, the state is WAITING. This state looks at the resulting state from the Steady State Machine 701. If the Steady State is greater than LF DELTA Y-INT OK, at step 817, the curl state is changed to NO CURL, at step 819. This is the desired state.

The system remains in state NO CURL, at step 821 and until there is data showing the absolute value of rate of change of the edge is greater than maximum curl rate, at state 823, the state will remain as NO CURL. Once the sensor detected value is detected moving faster than the maximum curl rate, the direction of change will be detected at step 825 and will result in either the ROC DECREASE, at step 827, or ROC INCREASE, at step 829, states being set.

In state ROC DECREASE, at step 831, stability in the film edge sensor measurements, FlatEdge change rate, is tested at step 833. If the rate of change is determined to be less than the FlatEdge change rate (805), the state changes to STABLE FROM DECREASE at step 835.

State STABLE FROM DECREASE at step 837 is similar to state ROC DECREASE but evaluates for stability of the edge measurement below the FlatEdge change rate. Stability must be persistent for at least the operator-selected Curl Cleared Delay time, at step 839, and if so the state change to NO CURL at step 841.

Steps 843 through 853 are the corresponding processing for detecting the conditions for NO CURL, at step 853, after ROC INCREASE, at step 843 and STABLE FROM INCREASE, at step 849. In these processes, the change rate measured by the edge sensor is higher than the FlatEdge change rate (805).

At step 855, the calculated state is written to the ALC database (101) for use by the next pass in this state machine and also by other state machines. The process is finished at block 857.

FIG. 9 details the operation of the SIZE CHANGE State Machine process 901. The objective is provide indication to the ALC process of unintentional or operator-initiated size changes that might be in process. During size changes, the ALC calibration is delayed until the size change is complete. Therefore it is important for the Size Change State Machine to provide an accurate reflection of size change conditions. The beginning state is SIZE WAITING (step 907) and the desired state is SIZE FINISHED (step 925). The possible states are: SIZE WAITING, SIZE CHANGE ARMED, SIZE SP CHANGING, and SIZE FINISHED. All states are exclusive. Any state change can optionally be delayed by implementing a continuous decision count to avoid state chattering. In this state machine, only the state SIZE SP CHANGING has a continuous decision count implemented.

Step 903 reads the current state from the ALC Database (101) and executes a case select block 905 which decides which single decision tree branch to execute (907, 915, 921, or 927).

At step 907 the state is SIZE WAITING. The state remains until the width controller is put into automatic or auto mode. Once in auto mode, the decision block 909 determines if the state will change to SIZE SP CHANGING (911) or SIZE CHANGE ARMED (913). Note that if the width controller is NOT in auto mode, there will be no calibration process operations.

At step 915, the state is SIZE CHANGED ARMED. If a width target change is received from the operator, at step 917, the state changes to SIZE SP CHANGING after the change takes effect, at step 919.

At step 921, the state is SIZE SP CHANGING. This state waits for the actual width to reach the target width (within the width deviation deadband parameter) at step 923. Once the actual width is within the deadband (or optionally for a predetermined time), the state changes to SIZE FINISHED, at step 925.

At step 927, the state is SIZE FINISHED. This state resets the SIZE State Machine on occurrence of one of two conditions. First is if the controller is changed to the manual mode, at step 929, the state changes to SIZE WAITING, at step 931. Second, if a width target change is detected, at step 933), the state will return to SIZE SP CHANGING, at step 935.

Finally at step 937, the SIZE State Machine writes the current state back to the ALC Database (101) and then ends at step 939.

Figure 10:
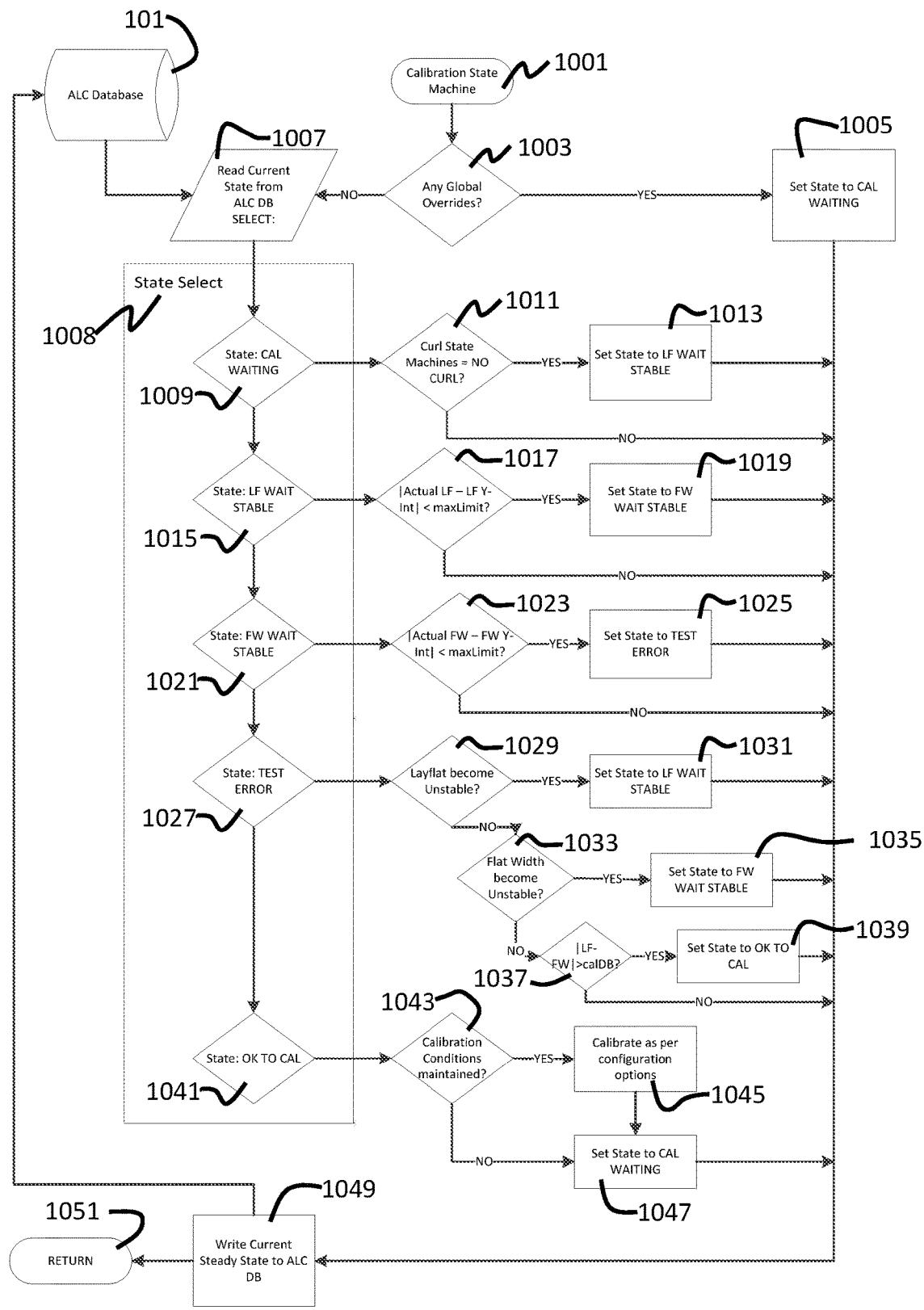

FIG. 10 details the operation of the CALIBRATION State Machine process 1001. The objective of this state machine is to make the final decision as to when the earliest possible calibration can be completed without causing a calibration that required a recalibration thereby wasting time and production materials. The beginning state is CAL WAITING (step 1009) and the desired state is OK TO CAL (step 1041). The possible states are: CAL WAITING, LF STABLE WAIT, FW STABLE WAIT, TEST ERROR, and OK TO CAL. All states are exclusive. Any state change can optionally be delayed by implementing a continuous decision count, as described above.

Step 1003 reads the current state from the ALC Database (101) and executes a case select step 1008 which decides which single decision tree branch to execute (1009, 1015, 1021, 1027 or 1041).

At step 1009 the state is CAL WAITING. In this state, both the left and right curl states are monitored, at step 1011, until they are both in the NO CURL state, at which time the state changes to LF WAIT STABLE at step 1013.

At step 1015 the state is LF WAIT STABLE. In this state, the difference between the actual layflat (from tube diameter sensors) and the layflat linear regression metric Y-Intercept is evaluated, at step 1017. When the difference is less than the pre-selected (as selected by the manufacturer, the installer, or the actual operator of the apparatus, generally prior to its operation) maximum limit parameter for an pre-selected decision count, the state changes to FW WAIT STABLE at step 1019. As this difference value decreases in magnitude, the overall slope of the actual layflat approaches zero indicating the calibration process can move to the next state.

At step 1021, the state is FW WAIT STABLE. In this state, the difference between the actual flat-width (from flat-measurement bar 29) and the flat width linear regression metric Y-Intercept is evaluated, at step 1023. When the difference is less than the pre-selected maximum limit parameter for an pre-selected decision count, the state changes to TEST ERROR, at step 1025.

At step 1027, the state is TEST ERROR. In this state it is important to revisit key conditions that would allow the calibration process to proceed. Steps 1029 and 1033 retest and confirm the conditions that allowed the TEST ERROR state to occur.

At step 1029, the difference between the actual layflat (from tube diameter sensors 21) and the layflat linear regression metric Y-Intercept is evaluated. When the difference is greater than the pre-selected maximum limit parameter (the inverse of step 1017) for an pre-selected decision count, the state changes or reverts to LF WAIT STABLE, at step 1031.

At step 1033, the difference between the actual layflat (from flat-measurement bar 29) and the flat width linear regression metric Y-Intercept is evaluated. When the difference is greater than the pre-selected maximum limit parameter for an pre-selected decision count (the inverse of step 1023) the state changes to FW WAIT STABLE, at step 1035).

At step 1037, the difference between the actual layflat measurements (from the tube diameter sensors 21) and the actual flat-width measurements (from flat-measurement bar 29) is sufficient to warrant a calibration. An operator-configurable calibration deadband parameter controls the outcome of this decision which if true, results in the state being changed to OK TO CAL (1039).

At step 1041, the state is OK TO CAL. As in the TEST ERROR state it is important to revisit the key conditions that would allow the calibration to proceed. At step 1043, the conditions that allowed the OK TO CAL state to occur are retested. More precisely, it repeats the evaluation of step 1037 and re-evaluates whether the RUN state machine is greater than or equal to STARTUP OCCURING (613 of FIG. 6). If these conditions are within proper limits, the final test is to make sure the difference between the target width and the flat width is less than the pre-selected maximum calibration limit. This limit ensures that only a true calibration can occur. By definition of this system, a true calibration assumes the measured value of the flat width is in the ballpark of the actual width as measured by the tube diameter sensors. If it is not, the calibration system will not proceed and the operator must intervene to correct this condition. This condition would typically occur if the machine is starting for the very first time and has never been calibrated.

At step 1045, the conditions have been met for a sufficient time limit to make the calibration. As mentioned in the description of the RUN state machine, calibration can be pre-selected to occur under a variety of conditions. This step takes into account the allowed configurations and matches those configurations to the RUN state. If there is a match between the pre selected calibrations and the RUN state, the layflat calibration process will proceed. As described above in connection with the prior art, calibration is accomplished by inputting a flat-width measurement into the width controller associated with tube extrusion die 13. The foregoing processes measure and analyze a plurality of values to indicate when the system is in stable operation in a variety of aspects and, when operation is stable, the flat widths measured at flat-width sensors 29 are steady or constant or nearly so, so that any of the plurality of flat-width values or samples measured when the system is indicated to be in stable operation may be used as a calibration value to be input to the width controller.

At step 1047, the state is reset to CAL WAITING whether the calibration was successful or not. Also in this step, the total time required to reach step 1045 is recorded and is used as a forced delay before the next calibration can occur (as depicted in step 315 of FIG. 3).

Finally, at step 1049, the state machine writes the current state back to the ALC Database (101) and then ends at step 1051.

By measuring film data at the tube extrusion die and downstream from it, and applying predictive analysis of the measured data, the method and process according to the preferred embodiment of the present invention permits autonomous calibration of a blown-film extrusion apparatus with minimal operator intervention and skill requirements. Thus automated, more precise film width is obtained with faster job changes and less scrap produced.

I claim:

1. A method of autonomously calibrating product output width from a blown-film extrusion apparatus, the method comprising the steps of:
    extruding, from a tube extrusion die including a width controller, a polymer tube;
    flattening the tube and accumulating the flattened tube at an accumulation point;
    continuously measuring, downstream of the tube extrusion die and proximal the accumulation point of flattened tubing, a width of the flattened tube to produce a plurality of flat-width samples;
    calculating a slope value over each of a plurality of selected intervals of the flat-width samples to determine the stability of the width of the flattened tube;
    calculating a y-intercept value over each of the selected intervals of the flat-width samples to determine a forecast trend of the width of the flattened tube;
    calculating a variance value of the slope values to; and
    when the slope values, y-intercept values, and variance value are within selected parameters indicative of a stable operation of the tube extrusion die, calibrating the tube extrusion die by inputting one of the flat-width samples to the width controller.

2. The method according to claim 1 further comprising the steps of:
    continuously measuring, proximal the tube extrusion die, a diameter of tube extruded by the die, to produce a plurality of layflat samples; and
    calculating a layflat slope value over each of a plurality of selected intervals of the layflat samples to determine the stability of the width of the flattened tube;
    calculating a layflat y-intercept value over each of the selected intervals of the layflat samples to determine a forecast trend of the width of the flattened tube; and
    calculating a layflat variance value of the slope values.

3. The method according to claim 1, further comprising the steps of:
    monitoring a relative position of at least one edge of the flattened tube and calculating a rate of change of each edge;
    if the rate of change of one of the edges oscillates above a selected threshold, indicating a wrinkle at the edge of the flattened tube; and
    if the rate of change of one of the edges exceeds a threshold for a selected period of time, indicating a curl at the edge of the flattened tube.

4. The method according to claim 2, wherein the step of calculating the slope value over each of the plurality of selected intervals of flat-width and layflat samples further comprises the step of applying least-squares regression to the layflat samples and the flat-width samples within each selected interval.

5. The method according to claim 2, wherein the step of calculating the y-intercept value over each of the plurality of selected intervals of flat-width and layflat samples further comprises the step of applying least-squares regression to the layflat samples and the flat-width samples within each selected interval.

6. A method of autonomously calibrating product output width from a blown-film extrusion apparatus, the method comprising the steps of:
    extruding, from a tube extrusion die including a width controller, a polymer tube;
    flattening the tube and accumulating the flattened tube at an accumulation point;
    continuously measuring, proximal the tube extrusion die, a diameter of tube extruded by the die, to produce a plurality of layflat samples;
    continuously measuring, downstream of the tube extrusion die and proximal the accumulation point of flattened tube, a width of the flattened tube, to produce a plurality of flat-width samples;
    monitoring relative positions of each edge of the flattened tube and calculating a rate of change of the relative positions, and, if the rate of change of the relative position of one edge oscillates above a selected threshold, indicating a wrinkle at the edge of the flattened tube, and, if the rate of change of the relative position of one edge exceeds a threshold for a selected period of time, indicating a curl at the edge of the flattened tube;
    calculating a slope value over each of a plurality of selected intervals of the layflat samples and the flat-width samples to determine the stability of the diameter of the tube and the width of the flattened tube;
    calculating a y-intercept value over each of the selected intervals of the layflat samples and the flat-width samples to determine a forecast trend of the diameter of the tube and the width of the flattened tube;
    calculating a variance value of the slope values of each of the layflat samples and flat-width samples; and when the slope values, y-intercept values, and variance values are within selected parameters indicative of a stable operation of the tube extrusion die and wrinkles and curls at the edges have been absent for selected intervals, calibrating the tube extrusion die by inputting one of the flat-width samples to the width controller.

7. The method according to claim 6, wherein the step of calculating the slope value over each of the plurality of selected intervals of flat-width and layflat samples further comprises the step of applying least-squares regression to the layflat samples and the flat-width samples within each selected interval.

8. The method according to claim 6, wherein the step of calculating the y-intercept value over each of the plurality of selected intervals of flat-width and layflat samples further comprises the step of applying least-squares regression to the layflat samples and the flat-width samples within each selected interval.

9. A method of autonomously detecting curl and wrinkle conditions in flattened tubing in a blown-film extrusion apparatus, the method comprising the steps of:
- extruding, from a tube extrusion die including a width controller, a polymer tube;
- flattening the tube and accumulating the flattened tube at an accumulation point;
- measuring a width of the tube;
- monitoring relative positions of at least one edge of the flattened tubing prior to the accumulation point and calculating a rate of change of the relative positions;
- if the rate of change of the relative position of the edge oscillates above a selected threshold, indicating a wrinkle at the edge of the flattened tube;
- if the rate of change of the relative position of the edge exceeds a threshold for a selected period of time, indicating a curl at the edge of the flattened tube; and
- when the measured width is within selected parameters indicative of a stable operation of the tube extrusion die and wrinkles and curls at the edge have not been indicated for a selected interval, calibrating the tube extrusion die by inputting the measured width to the width controller.

10. The method according to claim 9, wherein the step of measuring the width of the tube further comprises the steps of:
- continuously measuring, proximal the tube extrusion die, a diameter of the tube extruded by the die, to produce a plurality of layflat samples;
- continuously measuring, downstream of the tube extrusion die and proximal the accumulation point of flattened tube, a width of the flattened tube, to produce a plurality of flat-width samples;
- calculating a slope value over each of a plurality of selected intervals of the layflat samples and the flat-width samples to determine the stability of the diameter of the tube, and the width of the flattened tube;
- calculating a y-intercept value over each of the selected intervals of the layflat samples and the flat-width samples to determine a forecast trend of the diameter of the tube and the width of the flattened tube; and
- calculating a variance value of the slope values of each of the layflat samples and flat-width samples.

11. The method according to claim 9, wherein the step of calculating the slope value over each of the plurality of selected intervals of flat-width and layflat samples further comprises the step of applying least-squares regression to the layflat samples and the flat-width samples within each selected interval.

12. The method according to claim 6, wherein the step of calculating the y-intercept value over each of the plurality of selected intervals of flat-width and layflat samples further comprises the step of applying least-squares regression to the layflat samples and the flat-width samples within each selected interval.

* * * * *